US009594650B2

(12) United States Patent
Chang et al.

(10) Patent No.: US 9,594,650 B2
(45) Date of Patent: Mar. 14, 2017

(54) STORAGE SYSTEM AND A METHOD USED BY THE STORAGE SYSTEM

(71) Applicant: International Business Machines Corporation, Armonk, NY (US)

(72) Inventors: Yande Chang, Shanghai (CN); Duo Chen, Shanghai (CN); Min Fang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/615,664

(22) Filed: Feb. 6, 2015

(65) Prior Publication Data

US 2015/0242291 A1  Aug. 27, 2015

(30) Foreign Application Priority Data

Feb. 27, 2014  (CN) .......................... 2014 1 0068897

(51) Int. Cl.
*G06F 11/00* (2006.01)
*G06F 11/20* (2006.01)

(52) U.S. Cl.
CPC ...... *G06F 11/2023* (2013.01); *G06F 11/2038* (2013.01); *G06F 11/2043* (2013.01); *G06F 11/2046* (2013.01)

(58) Field of Classification Search
CPC ............. G06F 11/2023; G06F 11/2038; G06F 11/2043; G06F 11/2046; G06F 11/0709;
(Continued)

(56) References Cited

U.S. PATENT DOCUMENTS 7,739,540 B2   6/2010   Akutsu et al.
8,572,343 B2  10/2013   Jennas, II et al.
(Continued)

FOREIGN PATENT DOCUMENTS

WO   2012116117 A2   8/2012
WO   2013162614 A1  10/2012

OTHER PUBLICATIONS

HP, "HP 3PAR StoreSery 7000 Storage for Microsoft SQL Server environments with VMware," Technical white paper, Feb. 2013, HP 3PAR StoreSery 7000 enhances Microsoft SQL Server virtualization, Rev. 1, Hewlett-Packard Development Company, L.P.
(Continued)

*Primary Examiner* — Joseph D Manoskey
(74) *Attorney, Agent, or Firm* — L. Jeffrey Kelly

(57) ABSTRACT

Performing failover processing between a production host and a backup host, a storage system is connected to the production host and the backup host. In response to a failure of the production host, metadata is obtained of data blocks that have been cached from an elastic space located in a fast disk of the storage system. A storage capacity of the elastic space is expanded. Data blocks are obtained to which the metadata corresponds according to the metadata and the storage capacity of the expanded elastic space, and storing the same in the expanded elastic space. In response the backup host requesting the data blocks to which the metadata corresponds, and the data blocks to which the metadata corresponds have already been stored in the expanded elastic space, data blocks are obtained to which the metadata corresponds from the expanded elastic space and transmitting the same to the backup host.

18 Claims, 7 Drawing Sheets

(58) Field of Classification Search
CPC ............ G06F 11/0727; G06F 11/1435; G06F 11/1458; G06F 11/1612; G06F 11/2017; G06F 11/2089
USPC ................. 714/6.1, 6.2, 6.21, 6.3, 11, 42
See application file for complete search history.

(56) References Cited

U.S. PATENT DOCUMENTS

| | | | |
|---|---|---|---|
| 8,769,336 B1* | 7/2014 | Natanzon | G06F 11/1471 714/6.23 |
| 2010/0211829 A1* | 8/2010 | Ziskind | G06F 11/0757 714/48 |
| 2012/0215970 A1* | 8/2012 | Shats | G06F 12/0866 711/103 |
| 2012/0265924 A1* | 10/2012 | Purdy | G06F 12/0871 711/103 |
| 2012/0303929 A1 | 11/2012 | Chiu et al. | |
| 2013/0219122 A1 | 8/2013 | Benhase et al. | |
| 2013/0246354 A1* | 9/2013 | Clayton | G06F 11/2071 707/624 |
| 2015/0363319 A1* | 12/2015 | Qi | G06F 3/0619 711/121 |

OTHER PUBLICATIONS

Pending application No. 201410068897.1 (China), entitled "A Storage System And A Method Used By The Storage System," filed on Feb. 27, 2014.

* cited by examiner

STORAGE SYSTEM AND A METHOD USED BY THE STORAGE SYSTEM

BACKGROUND

The present invention relates to storage technology, and more particularly, to a storage system and a method used by the storage system.

Modern enterprises cannot develop without information technology, and most enterprises rely on information technology to ensure their normal operations. IT infrastructure for company operations usually includes an operation host computer, hereinafter referred to as the production host. Once a failure occurs to the production host, the impact is obvious. Therefore, enterprises generally use another backup host computer for the production host. The backup host can immediately take over operations of the production host once a problem occurs in the production host.

Generally speaking, the production host and the backup host use hardware systems that are the same. In recent years, since capacity of cache SSD in a host generally reaches the TB level, and prices of cache SSD are relatively expensive, enterprises often configure capacity of cache SSD of the production host to be superior to that of the backup host, which may cause some technical problems.

FIG. 2 shows working flows of a conventional production host, backup host, and storage system when the production host and the backup host cache synchronously. According to FIG. 2, when the production host sends a read/write IO to the storage system, the storage system will record response time of the IO and generate a caching scheme. In a mode in which the production host and the backup host cache synchronously, the storage system will send the caching scheme to the production host and the backup host simultaneously. The two will decide which data blocks are to be cached in the local data storage (data is stored in the data storage system in the form of data blocks) in accordance with their own local cache capability, and send a request to cache data to the storage system, respectively, so as to obtain required data blocks. As the capacity of cache SSD of the production host may be superior to that of the backup host, the rendered result is that the capacity of caching data blocks in the local storage of the production host is larger than that of the backup host.

If a failure occurs to the production host after the data blocks have already been cached in the local storage of the production host, the backup host will begin to perform a failover. As a backup of the production host, the backup host will continue to execute applications running on the production host. Since the capacity of caching data blocks in the local storage of the backup host may be smaller than that of the production host, in this case, the data blocks cached by the backup host are a subset of the data blocks cached by production host, resulting in that the backup host is likely to request from the storage system the data blocks that have been cached in the local storage of the production host previously, but have not been cached in the backup host. However, due to internal tiering technology of the storage system, after a data block is cached in the local storage and read by the production host, access frequency of this data block at the end of the storage system will sharply drop, the data block may be considered as cold data and transferred to a slow disk (e.g., tape, etc.) with a longer read time, so the data blocks desired by the backup host may be probably acquired from the slow disk at the end of the storage system. In this way, readability will be quite low, and longer failover time is required.

SUMMARY

Embodiments of the present invention disclose a method and system for performing failover processing between a production host and a backup host, a storage system is connected to the production host and the backup host. In response to a failure of the production host, metadata is obtained of data blocks that have been cached from an elastic space located in a fast disk of the storage system. A storage capacity of the elastic space is expanded. Data blocks are obtained to which the metadata corresponds according to the metadata and the storage capacity of the expanded elastic space, and storing the same in the expanded elastic space. In response the backup host requesting the data blocks to which the metadata corresponds, and the data blocks to which the metadata corresponds have already been stored in the expanded elastic space, data blocks are obtained to which the metadata corresponds from the expanded elastic space and transmitting the same to the backup host.

BRIEF DESCRIPTION OF THE SEVERAL VIEWS OF THE DRAWINGS

The above and other objects, features and advantages of the present disclosure will become more apparent by describing exemplary embodiments of the present disclosure in more detail in conjunction with the accompanying drawings, wherein the same reference numerals represent the same components in the exemplary embodiments of the present disclosure.

DETAILED DESCRIPTION

Some exemplary embodiments will be described in more detail with reference to the accompanying drawings. However, the present disclosure can be implemented in various ways, and thus should not be construed to be limited to the embodiments disclosed herein.

Figure 1:
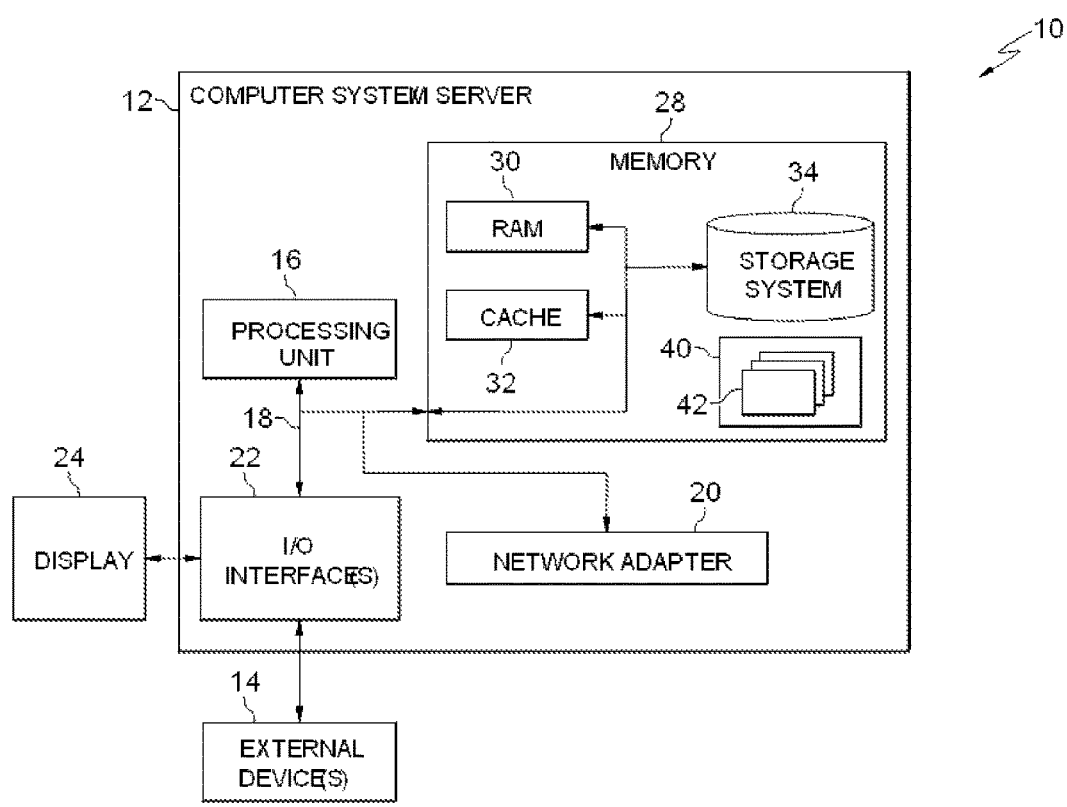
FIG. 1 shows an exemplary computer system/server 12 which is applicable to implement the embodiments of the present invention.
Figure 2:
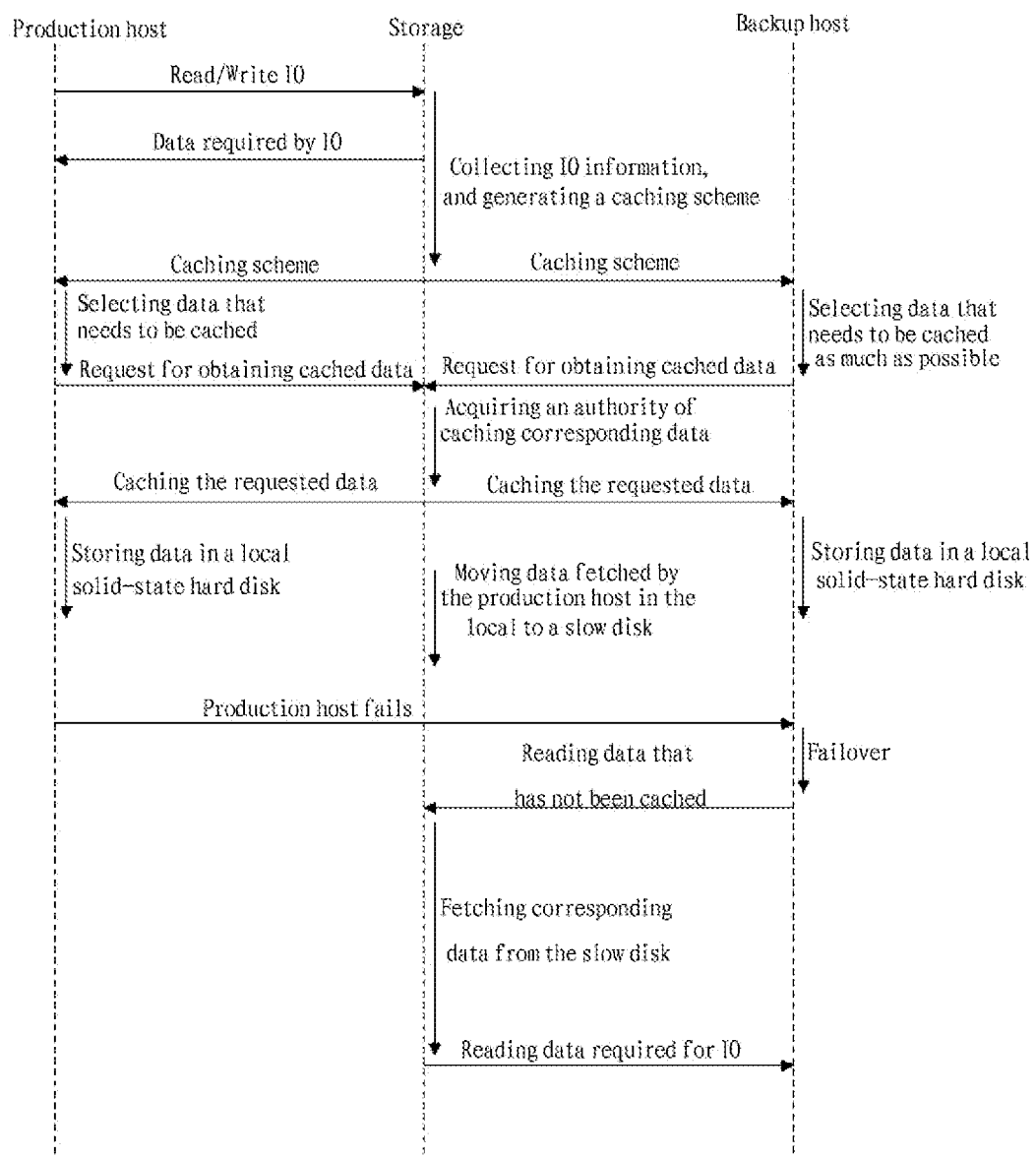
FIG. 2 shows working flows of the conventional production host, backup host, and storage system when the production host and the backup host cache synchronously.

Referring now to FIG. 1, an exemplary computer system/server 12 which is applicable to implement an embodiment 10 of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The current storage system may use a storage tiering technique, with which storage performance can be improved effectively, and hardware costs can be saved. In the storage tiering technique, a tier for storing data is determined according to an access frequency of data blocks where the data resides. A different storage tier uses a different storage medium to achieve a different access efficiency. For example, data blocks with a high access frequency, also called hot data, are stored on a storage medium (also called fast disk) in the fastest tier for storage, such as a solid state hard disk, a flash memory, etc. Data blocks with a low access frequency, also known as cold data, are stored on a storage medium (also called slow disk) in a slower tier for storage, such as a magnetic tape, a magnetic disk, an optical disk etc.

In implementations of the present invention, an elastic space is established in the fast disk of the storage system. The elastic space is utilized to store data needed by the backup host but backed up the production host. There is no need for the production host and the backup host to make any modifications—they just need to adopt the original workflows to achieve the result of improving the failover efficiency.

Figure 3:
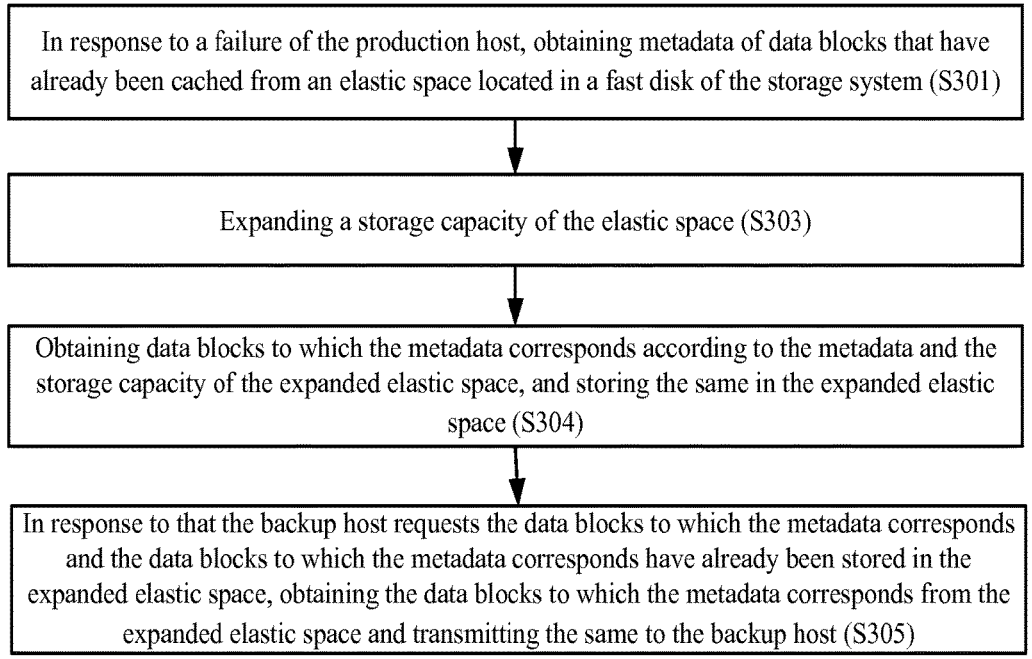
FIG. 3 schematically illustrates a flowchart of a method used by the storage system.

According to an implementation of the present invention, FIG. 3 is a flowchart of a method used by the storage system, wherein the storage system is connected, via a network, with a production host and a backup host that performs failover for the production host respectively. According to FIG. 3, the method comprises: step S301, in response to a failure of the production host, obtaining metadata of data blocks that have already been cached from an elastic space located in a fast disk of the storage system; in step S303, expanding a storage capacity of the elastic space; in step S304, obtaining data blocks to which the metadata corresponds according to the metadata and the storage capacity of the expanded elastic space, and storing the same in the expanded elastic space; and in step S305, in response to that the backup host requests the data blocks to which the metadata corresponds and the data blocks to which the metadata corresponds have already been stored in the expanded elastic space, obtaining the data blocks to which the metadata corresponds from the expanded elastic space and transmitting the same to the backup host. As will be appreciated by a person skilled in the art, step S303 and step S304 both are executed under the precondition of in response to that the production host fails, multiple steps are divided for convenience of the description. Step S305 enables that the already-cached data can be definitely transmitted from the elastic space located on the fast disk of the storage system to the backup host, thus achieving the aim of improving the failover efficiency.

In the method shown in FIG. 3, the elastic space has already been established, and metadata of the cached data has already been stored in the elastic space. The elastic space located in the fast disk may be a variable storage space, that is, its storage capacity can be changed on demand. In practical applications, the storage capacity of the elastic space often has a maximum upper limit, whose value can be set by the user, referred to herein as a maximum storage capacity of the elastic space, which may be different from the size of the storage capacity of the data blocks to which the metadata corresponds. In an implementation, prior to step S303, step S302 (not shown in FIG. 3) determines a size relationship between a maximum storage capacity of the elastic space and a storage capacity of the data blocks to which the metadata corresponds.

In the case that step S302 exists, correspondingly, expanding a storage capacity of the elastic space in step S303 optionally comprises at least the following two situations:

(1) in response to that a maximum storage capacity of the elastic space is less than a storage capacity of the data blocks to which the metadata corresponds, expanding the elastic space to its maximum capacity; and (2) in response to that a maximum storage capacity of the elastic space is more than a storage capacity of the data blocks to which the metadata corresponds, expanding the elastic space until the storage capacity of the elastic space at least is capable of storing the data blocks to which the metadata corresponds.

Correspondingly, step S304 of obtaining data blocks to which the metadata corresponds according to the metadata and the storage capacity of the elastic space comprises:

(1) in response to that a maximum storage capacity of the elastic space is less than a storage capacity of the data blocks to which the metadata corresponds, obtaining a portion of the data blocks to which the metadata corresponds, a storage capability of the portion of the data blocks to which the metadata corresponds being close to the maximum storage capacity of the elastic space; and (2) in response to that a maximum storage capacity of the elastic space is more than a storage capacity of the data blocks to which the metadata corresponds, obtaining all the data blocks to which the metadata corresponds.

As will be appreciated by a person skilled in the art, the storage capacity of the elastic space can be expanded into any size within the range of the maximum capacity of the elastic space. Obtaining data blocks to which the metadata corresponds according to the metadata and the storage capacity of the elastic space also needs to correspondingly adjust the data blocks to which the metadata stored in the elastic space corresponds according to the storage capability of the expanded elastic space.

When the maximum storage capacity of the elastic space is less than the storage capability of the data blocks to which the metadata corresponds, the elastic space stores only a portion of the data blocks to which the metadata corresponds, the remaining data may be in the slow disk, or may also be stored in the fast disk. Conventional tiering storage mechanisms may be utilized to gradually migrate the data to the fast disk. Even so, the failover efficiency can be improved greatly.

Metadata of the data blocks that have already been cached as stored in the elastic space is metadata of data blocks that have already been cached by the production host; and may also be metadata of differential data blocks between the data blocks that have already been cached by the production host and the data blocks that have already been cached by the backup host.

If metadata of the data blocks that have already been cached as stored in the elastic space is metadata of data blocks that have already been cached by the production host, prior to step S301, the method shown in FIG. 3 further comprises the following: step 1, receiving a request for caching data blocks from the production host; step 2, sending the requested data blocks to the production host; step 3, receiving a request for caching data blocks from the backup host; and step 4, storing the metadata in the elastic space as metadata of data blocks that have already been cached. Herein, a specific execution order is required for steps 1, 3, and 4, but step 2 may be executed prior to or after any of steps 3 and 4, which will not affect the technical effect of the present invention.

If metadata of the data blocks that have already been cached as stored in the elastic space is metadata of differential data blocks between the data blocks that have already been cached by the production host and the data blocks that have already been cached by the backup host, the following are comprised prior to the method shown in FIG. 3: step 11, receiving a request for caching data blocks from the production host; step 12, sending the requested data blocks to the production host; step 13, receiving a request for caching data blocks from the backup host; step 14, sending the requested data blocks to the backup host; step 15, generating metadata of differential data blocks between the data blocks that have already been cached by the production host and the data blocks that have already been cached by the backup host; and step 16, storing the metadata in the elastic space as metadata of data blocks that have already been cached. Herein, the above steps 11 and 13, steps 12 and 14 may be executed substantially synchronously or sequentially, respectively, but an anterior-posterior relationship is required between steps 11 and 12, steps 13 and 14, respectively; further, steps 12 and 14 may be executed prior to or after any of steps 15 and 16, which will not affect the technical effect of the present invention.

Usually, along with time, the storage system always makes statistics of the access frequency of I/O. If the access frequency of I/O gradually decreases, then in this case, the data blocks will be migrated from a tier with the highest access frequency to a tier with the lowest access frequency gradually. This migration may be carried out gradually, and may be also carried out immediately after the data blocks are cached, and it is carried out by a storage controller of the storage system.

Figure 4:
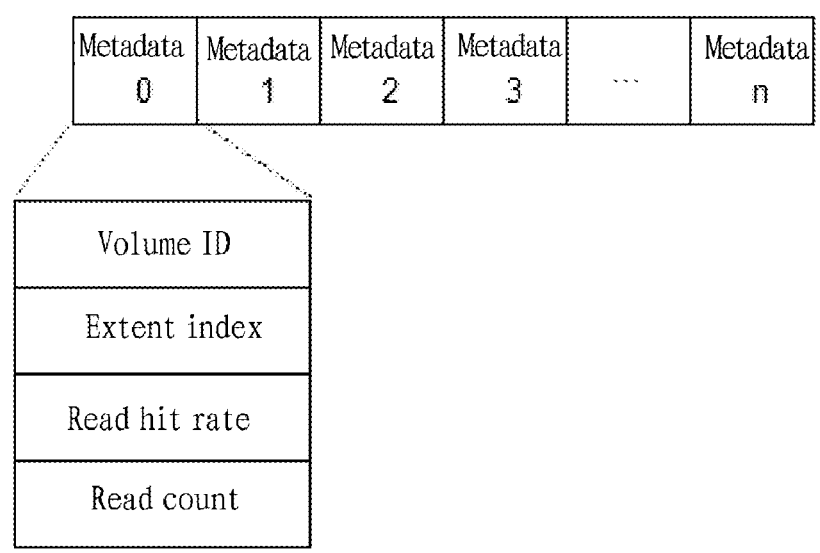
FIG. 4 schematically illustrates a structure of metadata.

The above metadata stored in the elastic space includes storage locations of the data blocks to which the metadata corresponds in the storage system. In an exemplary embodiment, FIG. 4 schematically illustrates a structure of metadata. According to FIG. 4, the metadata is organized with host as a unit. Metadata in a metadata table in each host contains the storage locations of the already-cached data blocks to which the metadata corresponds, i.e., a volume ID and an extent index. Preferably, it further contains a read hit rate and a read count of the data blocks to which the metadata corresponds. In the storage system, a storage device will be virtualized into the form of a volume, whose identification is unique. The locations of the data blocks in the storage system can be positioned by way of the volume ID and the extent index in a volume. Each metadata takes extent as a unit. The volume ID is used for identifying which volume the extent belongs to, and the extent index is for identifying which piece of extent in the volume in terms of sequence. The read hit rate records a frequency that the extent is read, and the read count records the number of times that the extent is read.

The access frequency of the already-cached data blocks in the storage system will gradually decrease. When it reduces to a certain degree, the storage system will transfer the data to a slow disk for storage. However, when the production host fails, the storage locations in the storage system of the data blocks to which the metadata correspond as stored in the metadata are not known, for their storage locations may vary. Thus, the method shown in FIG. 3 further comprises step S306 (not shown in FIG. 3): in response to a change to the storage locations of the data blocks to which the metadata corresponds in the storage system, updating, in the elastic space, the storage locations of the data blocks to which the metadata corresponds in the storage system. There is no necessary consequential relationship between this step and the other steps shown in FIG. 3.

In an implementation, the method shown in FIG. 3 further comprises step S307 (not shown in FIG. 3): in response to a normal operation of the backup host, transferring the data blocks to which the metadata stored in the expanded elastic space corresponds to the fast disk of the storage system for storage; and step S308 (not shown in FIG. 3): reducing the storage capacity of the expanded elastic space. When the backup host operates normally, the data blocks to which the metadata corresponds as stored in the elastic space will be frequently accessed by the backup host. When the access efficiency thereof increases, a tiering storage software will move these data blocks to a fast disk gradually, then the elastic space can be released. In this case, the storage capacity of the elastic space can be reduced with demands, or even reduced to a zero storage capacity.

In an implementation, the method shown in FIG. 3 further comprises step S309 (not shown in FIG. 3): in response to a recovery to normality of the production host, re-allocating the storage capacity of the elastic space as a storage capability of metadata of new data that has already been cached. That is to say, when the production host returns to normal, the elastic space will again store metadata of the re-allocated new metadata that have already been cached, and its size varies accordingly.

There are a variety of ways for the storage system to detect whether a failure occurs to the production host. For example, a server of the storage system and the host may ensure connectivity through a heartbeat message. Once a problem occurs to one party and it is impossible for it to send a heartbeat messages on time, then the other party can consider that connection with the counterpart is lost after a timeout. Another way is that the host can initiatively remind the server of the storage system of the information that it is about to shut down before the failure, so that the server can be aware of the failure of the host.

Figure 5:
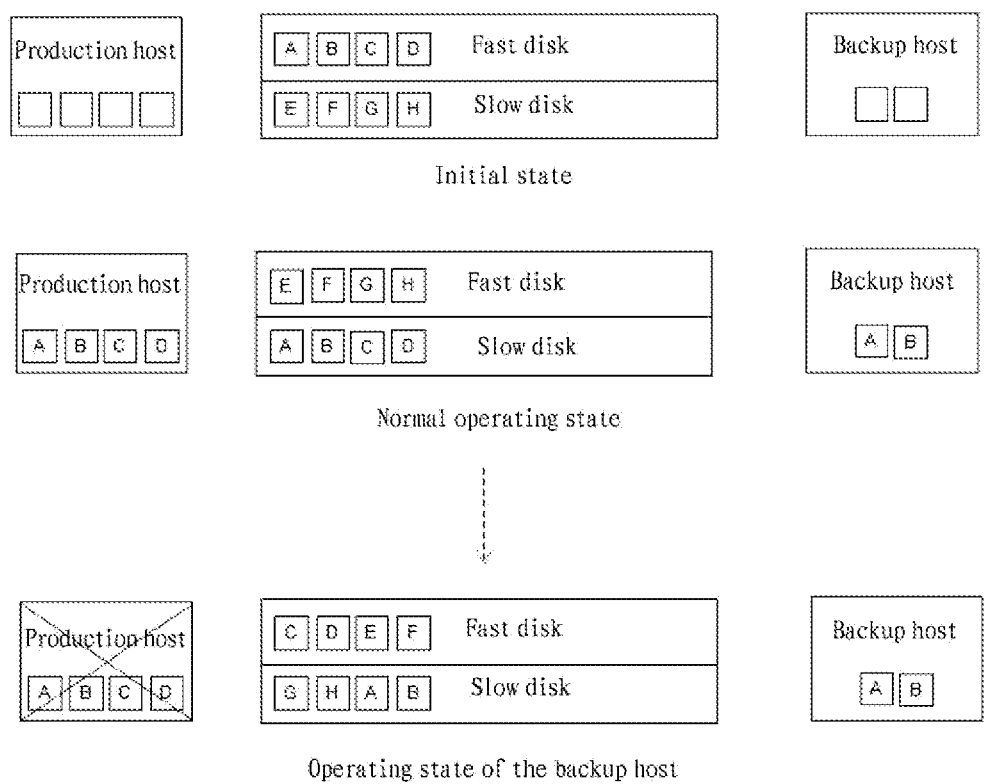
FIG. 5 shows a layout of data blocks in the production host, the storage system, and the backup host when the storage system has no elastic space.

FIG. 5 shows a layout of data blocks in the production host, the storage system, and the backup host when the storage system has no elastic space. To simplify the description, it is assumed that the cache capacity of the production host is four data blocks, and that of the backup host is two data blocks. Data blocks A, B, C, D are always the hottest data blocks. The middle data layout in FIG. 5 is a data layout of the data storage system. As can be seen from FIG. 5, at an initial operating state, the production host and the backup host both begin to cache data blocks. After the system runs for some time, that is, it reaches a normal operating state shown in FIG. 5, the data blocks A and B are cached to the production host and the backup host simultaneously. Blocks C and D are only cached to the production host. At the storage end, the data blocks A, B, C and D will become cold data and be moved to a slow disk. If the production host fails, the backup host will take over the production host workload and continue providing service. In the failover process, the probability that the data blocks C and D are requested is very high. In this case, the backup host can only read data from the slow disk, and system performance will become very poor. After the system runs for a long time, that is, it reaches an operating state of the backup host in FIG. 5, the tiering storage software will move C and D to a fast disk, but this is a result after an extremely long time in the future, so that the failover efficiency becomes worse.

Figure 6:
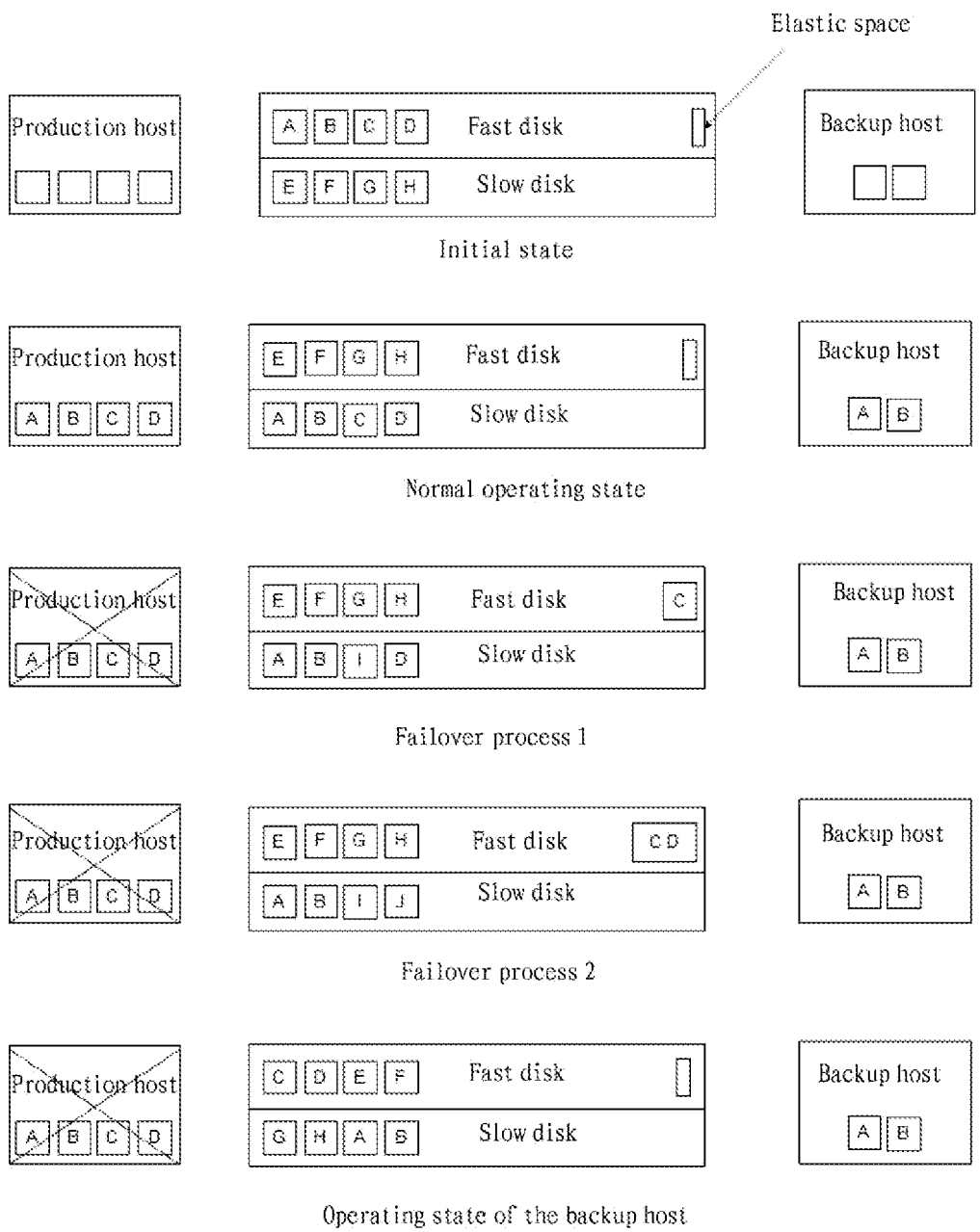
FIG. 6 shows a layout of data blocks in the production host, the storage system, and the backup host when the storage system has elastic space.

FIG. 6 shows a layout of data blocks in the production host, the storage system, and the backup host when the storage system has elastic space, wherein the elastic space stores metadata of differential data blocks between the data blocks that have already been cached by the production host and the data blocks that have already been cached by the backup host. It is assumed that a maximum storage capacity of the elastic space is more than a storage capacity of the data blocks to which the metadata corresponds. The middle data layout in FIG. 6 is the data layout of the storage system. As can be seen from FIG. 6, in an initial state, data begins to be stored in the elastic space. In a normal operating state, metadata has already been stored in the elastic space. If the production host fails, in the failover process 1 and 2, the elastic space will dynamically expand, and data blocks C and D are migrated gradually to the elastic space while the elastic space dynamically expands, so as to ensure performance in the failover process as much as possible. When the elastic space is expanded so that data that needs to be cached but has not been cached is all migrated to the elastic space, that is, the operating state of the backup host in FIG. 6, the elastic space will gradually reduce to a minimum space. When the production host returns to normal, all in the elastic space is recovered to an initial state, i.e., beginning a new round of storing metadata again, and thereby preparing for being used by a next failover. Thus it can be seen that, with the elastic space being used, efficiency and performance of the failover can be improved greatly.

Figure 7:
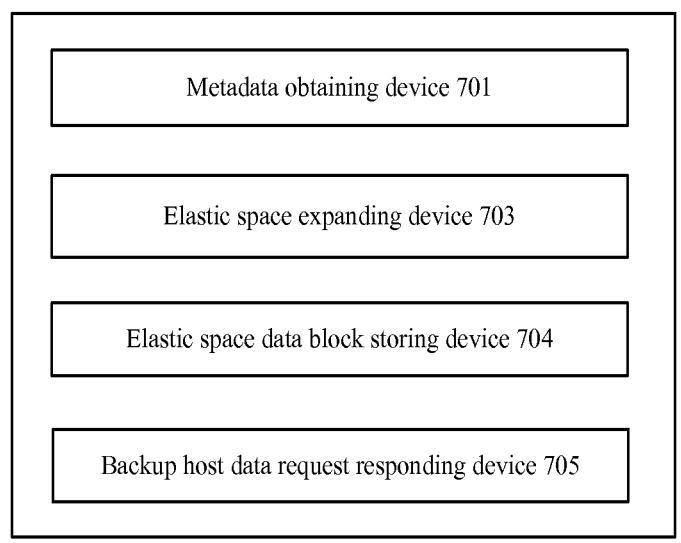
FIG. 7 shows a structural block diagram of the storage system according to an implementation of the present invention.

FIG. 7 shows a structural block diagram of a storage system according to an implementation of the present invention, wherein the storage system is connected, via a network, with a production host and a backup host that performs failover for the production host respectively. According to FIG. 7, the storage system comprises: a metadata obtaining device 701 configured to, in response to a failure of the production host, obtain metadata of data blocks that have already been cached from an elastic space located in a fast disk of the storage system; an elastic space expanding device 703 configured to expand a storage capacity of the elastic space; an elastic space data block storing device 704 configured to obtain data blocks to which the metadata corresponds according to the metadata and the storage capacity of the elastic space, and store the same in the expanded elastic space; and a backup host data request responding device 705 configured to in response to that the backup host requests the data blocks to which the metadata corresponds and the data blocks to which the metadata corresponds have already been stored in the expanded elastic space, obtain the data blocks to which the metadata corresponds from the expanded elastic space and transmit the same to the backup host.

In an implementation, the elastic space expanding device 703 is further configured to: in response to that a maximum storage capacity of the elastic space is less than a storage capacity of the data blocks to which the metadata corresponds, expand the elastic space to its maximum capacity; in response to that a maximum storage capacity of the elastic space is more than a storage capacity of the data blocks to which the metadata corresponds, expand the elastic space until the storage capacity of the elastic space at least is capable of storing the data blocks to which the metadata corresponds. Correspondingly, the elastic space data block storing device 704 is further configured to: in response to that a maximum storage capacity of the elastic space is less than a storage capacity of the data blocks to which the metadata corresponds, obtain a portion of the data blocks to which the metadata corresponds, a storage capability of the portion of the data blocks to which the metadata corresponds being close to the maximum storage capacity of the elastic space; in response to that a maximum storage capacity of the elastic space is more than a storage capacity of the data blocks to which the metadata corresponds, obtain all the data blocks to which the metadata corresponds.

In an implementation, the metadata includes storage locations of the data blocks to which the metadata corresponds in the storage system.

In an implementation, the storage system further comprises (not shown in FIG. 7): a storage location updating device configured to, in response to a change to the storage locations of the data blocks to which the metadata corresponds in the storage system, update, in the elastic space, the storage locations of the data blocks to which the metadata corresponds in the storage system.

In an implementation, the storage system further comprises (not shown in FIG. 7): a caching request receiving device configured to receive a request for caching data blocks from the production host; a response sending device configured to send the requested data blocks to the production host; a metadata generating device configured to generate metadata for data blocks that have already been cached by the production host; and a metadata storing device configured to store the metadata in the elastic space as metadata of data blocks that have already been cached.

In an implementation, the storage system further comprises (not shown in FIG. 7): a caching request receiving device configured to receive a request for caching data blocks from the production host and receive a request for caching data blocks from the backup host; a response sending device configured to send the requested data blocks to the production host and send the requested data blocks to the backup host; a metadata generating device configured to generate metadata of differential data blocks between the data blocks that have already been cached by the production host and the data blocks that have already been cached by the backup host; and a metadata storing device configured to store the metadata in the elastic space as metadata of data blocks that have already been cached.

In an implementation, the storage system further comprises (not shown in FIG. 7): a determining device configured to determine a size relationship between a maximum storage capacity of the elastic space and a storage capacity of the data blocks to which the metadata corresponds.

In an implementation, the storage system further comprises (not shown in FIG. 7): a data transferring device configured to, in response to a normal operation of the backup host, transfer the data blocks to which the metadata stored in the expanded elastic space corresponds to the fast disk of the storage system for storage; and an elastic space retracting device configured to retract the storage capacity of the expanded elastic space.

In an implementation, the storage system further comprises (not shown in FIG. 7): an elastic space allocating device configured to, in response to a recovery to normality of the production host, re-allocate the storage capacity of the elastic space as a storage capability of metadata of new data that has already been cached.

The present invention may be embodied as a system, a method and/or a computer program product. The computer program product may comprise a computer readable storage medium containing thereon computer readable program instructions that cause a processor to implement various aspects of the present invention.

A computer readable storage medium may be a tangible device that can maintain and store instructions used by an instruction execution device. A computer readable storage medium may be, for example, but not limited to, an electrical storage device, a magnetic storage device, an optical storage device, an electromagnetic storage device, a semiconductor storage device, or any suitable combination of the foregoing. More specific examples (a non-exhaustive list) of the computer readable storage medium would include the following: a portable computer diskette, a hard disk, a random access memory (RAM), a read only memory (ROM), an erasable programmable read-only memory (EPROM or Flash memory), a static random access memory (SRAM), a portable compact disc read-only memory (CD-ROM), a digital versatile disc (DVD), a memory stick, a floppy disc, a mechanical coding apparatus, e.g., a punched card having instructions stored thereon or a protrusion structure within a groove, or any suitable combination of the foregoing. The computer readable storage medium used herein is not to be interpreted as instantaneous signals per se, such as radio waves or other freely propagating electromagnetic waves, electromagnetic waves propagating through waveguide or other transmission media (e.g., a light pulse through the optical fiber cable), or electrical signal transmitted through wire.

The computer readable program instructions as described herein may be downloaded from a computer readable storage medium to each computing/processing device, or downloaded to an external computer or an external storage device via a network such as Internet, LAN, WAN, and/or a wireless network. The network may include copper transmission cables, fiber optic transmission, radio transmission, routers, firewalls, switches, gateway computer and/or edge servers. A network adapter or a network interface in each computing/processing device receives computer readable program instructions from the network and forwards the computer readable program instructions, so as to be stored in the computer readable storage medium in each computing/processing device.

Computer program instructions for executing operations of the present invention may be assembly instructions, instruction set architecture (ISA) instructions, machine instructions, machine-related instructions, microcode, firmware instructions, state set data, or source codes or object codes compiled with one programming language or any combination of multiple programming languages. The programming languages include object-oriented programming language, such as Smalltalk, C++ etc., as well as conventional procedural programming languages, such as the "C" programming language or a similar language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, state information of computer readable program instructions is used to customize electronic circuits, such as a programmable logic circuit, a field programmable gate array (FPGA) or a programmable logic array (PLA), the electronic circuit can execute computer readable program instructions to implement various aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing failover processing between a production host and a backup host, a storage system is connected to the production host and the backup host, the method comprising:
   in response to a failure of the production host:
   obtaining metadata of data blocks that have already been cached from an elastic space located in a fast disk of the storage system;
   expanding a storage capacity of the elastic space;
   in response to a maximum storage capacity of the elastic space being less than a storage capacity of the data blocks to which the metadata corresponds, expanding the elastic space to its maximum capacity;
   in response to the maximum storage capacity of the elastic space being more than the storage capacity of the data blocks to which the metadata corresponds, expanding the elastic space until the storage capacity of the elastic space at least is capable of storing the data blocks to which the metadata corresponds;
   obtaining data blocks to which the metadata corresponds according to the metadata and the storage capacity of the expanded elastic space, and storing the same in the expanded elastic space; and
   in response to the backup host requesting the data blocks to which the metadata corresponds and the data blocks to which the metadata corresponds have already been stored in the expanded elastic space, obtaining the data blocks to which the metadata corresponds from the expanded elastic space and transmitting the same to the backup host.

2. The method according to claim 1, wherein obtaining the data blocks to which the metadata corresponds according to the metadata and the storage capacity of the elastic space comprises:
   in response to the maximum storage capacity of the elastic space being less than the storage capacity of the data blocks to which the metadata corresponds, obtaining a portion of the data blocks to which the metadata corresponds, a storage capability of the portion of the data blocks to which the metadata corresponds being close to the maximum storage capacity of the elastic space;
   in response to the maximum storage capacity of the elastic space being more than the storage capacity of the data blocks to which the metadata corresponds, obtaining all the data blocks to which the metadata corresponds.

3. The method according to claim 1, wherein the metadata includes storage locations of the data blocks to which the metadata corresponds in the storage system.

4. The method according to claim 3, further comprising:
   in response to a change to the storage locations of the data blocks to which the metadata corresponds in the storage system, updating, in the elastic space, the storage locations of the data blocks to which the metadata corresponds in the storage system.

5. The method according to claim 1, further comprising:
   receiving a request for caching data blocks from the production host;
   sending the requested data blocks to the production host;
   generating metadata for data blocks that have already been cached by the production host; and
   storing the metadata in the elastic space as metadata of data blocks that have already been cached.

6. The method according to claim 1, further comprising:
   receiving a request for caching data blocks from the production host;
   sending the requested data blocks to the production host;
   receiving a request for caching data blocks from the backup host;
   sending the requested data blocks to the backup host;
   generating metadata of differential data blocks between the data blocks that have already been cached by the production host and the data blocks that have already been cached by the backup host; and storing the metadata in the elastic space as metadata of data blocks that have already been cached.

7. The method according to claim 1, further comprising: determining a size relationship between the maximum storage capacity of the elastic space and the storage capacity of the data blocks to which the metadata corresponds.

8. The method according to claim 1, further comprising: in response to a normal operation of the backup host, transferring the data blocks to which the metadata stored in the expanded elastic space corresponds to the fast disk of the storage system for storage; and retracting the storage capacity of the expanded elastic space.

9. The method according to claim 1, further comprising: in response to a recovery to normality of the production host, re-allocating the storage capacity of the elastic space as a storage capability of metadata of new data that has already been cached.

10. A storage system for performing failover processing between a production host and a backup host, the storage system comprising:

a metadata obtaining device configured to, in response to a failure of the production host, obtain metadata of data blocks that have already been cached from an elastic space located in a fast disk of the storage system;

an elastic space expanding device configured to expand a storage capacity of the elastic space;

in response to a maximum storage capacity of the elastic space being less than a storage capacity of the data blocks to which the metadata corresponds, the elastic space expanding device is configured to expand the elastic space to its maximum capacity;

in response to the maximum storage capacity of the elastic space being more than the storage capacity of the data blocks to which the metadata corresponds, the elastic space expanding device is configured to expand the elastic space until the storage capacity of the elastic space at least is capable of storing the data blocks to which the metadata corresponds;

an elastic space data block storing device configured to obtain data blocks to which the metadata corresponds according to the metadata and the storage capacity of the elastic space, and store the same in the expanded elastic space; and a backup host data request responding device configured to, in response to the backup host requesting the data blocks to which the metadata corresponds and the data blocks to which the metadata corresponds have already been stored in the expanded elastic space, obtain the data blocks to which the metadata corresponds from the expanded elastic space and transmitting the same to the backup host.

11. The storage system according to claim 10, wherein the elastic space data block storing device is further configured to:

in response to the maximum storage capacity of the elastic space being less than the storage capacity of the data blocks to which the metadata corresponds, obtain a portion of the data blocks to which the metadata corresponds, a storage capability of the portion of the data blocks to which the metadata corresponds being close to the maximum storage capacity of the elastic space;

in response to the maximum storage capacity of the elastic space being more than the storage capacity of the data blocks to which the metadata corresponds, obtain all the data blocks to which the metadata corresponds.

12. The storage system according to claim 10, wherein the metadata includes storage locations of the data blocks to which the metadata corresponds in the storage system.

13. The storage system according to claim 12, further comprising:

a storage location updating device configured to, in response to a change to the storage locations of the data blocks to which the metadata corresponds in the storage system, update, in the elastic space, the storage locations of the data blocks to which the metadata corresponds in the storage system.

14. The storage system according to claim 10, further comprising:

a caching request receiving device configured to receive a request for caching data blocks from the production host;

a response sending device configured to send the requested data blocks to the production host;

a metadata generating device configured to generate metadata for data blocks that have already been cached by the production host; and a metadata storing device configured to store the metadata in the elastic space as metadata of data blocks that have already been cached.

15. The storage system according to claim 10, further comprising:

a caching request receiving device configured to receive a request for caching data blocks from the production host and receive a request for caching data blocks from the backup host;

a response sending device configured to send the requested data blocks to the production host and send the requested data blocks to the backup host;

a metadata generating device configured to generate metadata of differential data blocks between the data blocks that have already been cached by the production host and the data blocks that have already been cached by the backup host; and a metadata storing device configured to store the metadata in the elastic space as metadata of data blocks that have already been cached.

16. The storage system according to claim 10, further comprising:

a determining device configured to determine a size relationship between the maximum storage capacity of the elastic space and the storage capacity of the data blocks to which the metadata corresponds.

17. The storage system according to claim 10, further comprising:

a data transferring device configured to, in response to a normal operation of the backup host, transfer the data blocks to which the metadata stored in the expanded elastic space corresponds to the fast disk of the storage system for storage;

an elastic space retracting device configured to retract the storage capacity of the expanded elastic space.

18. The storage system according to claim 10, further comprising:

an elastic space allocating device configured to, in response to a recovery to normality of the production host, re-allocate the storage capacity of the elastic space as a storage capability of metadata of new data that has already been cached.

* * * * *